United States Patent [19]

Marto

[11] 4,279,179
[45] Jul. 21, 1981

[54] IGNITION SYSTEM CONTROL
[75] Inventor: John H. Marto, Oshkosh, Wis.
[73] Assignee: J. I. Case Company, Racine, Wis.
[21] Appl. No.: 69,160
[22] Filed: Aug. 23, 1979
[51] Int. Cl.³ .................. B60K 41/02; A01D 75/28
[52] U.S. Cl. ............................ 74/850; 56/10.2; 56/10.5; 56/DIG. 15; 180/271
[58] Field of Search ............ 307/10 R; 74/850, 844; 56/10.2, 10.5, DIG. 15; 180/53 D, 53 FE, 271

[56] References Cited
U.S. PATENT DOCUMENTS

| | | | |
|---|---|---|---|
| 3,229,452 | 1/1966 | Hasenbank | 56/10.5 |
| 3,534,637 | 10/1970 | Tomlinson | 74/850 |
| 3,569,726 | 3/1971 | Reid | 307/10 R |
| 3,608,285 | 9/1971 | Berk | 56/10.2 |
| 3,626,676 | 12/1971 | Miley et al. | 56/10.2 |
| 3,731,471 | 5/1973 | Bening | 56/DIG. 15 |
| 3,733,794 | 5/1973 | Allen | 56/DIG. 15 |
| 3,736,729 | 6/1973 | Peterson | 56/10.5 |
| 3,782,084 | 1/1974 | Harkness | 56/DIG. 15 |
| 3,985,196 | 10/1976 | Deschamps | 56/10.2 |
| 4,051,915 | 10/1977 | Behrens | 307/10 R |

Primary Examiner—Leslie Braun
Attorney, Agent, or Firm—Cullen, Sloman, Cantor, Grauer, Scott & Rutherford

[57] ABSTRACT

An ignition system control for garden tractors is disclosed which includes a single control switch actuator interconnected with independently movable mower drive and transmission drive control linkages. The tractor engine will start only if both drive control linkages are in their disengaged positions which closes the control actuator switch. The control switch includes an elongated cantilevered contact which is engageable by a control wire member. The control wire member is responsive to movement by either the mower drive linkage or the transmission drive linkage. It is held in a transverse bridge-like fashion between the mower drive linkage and transmission drive linkage and above the cantilevered switch contact. The drive control linkages may move independently of one another, but only when both drives are disengaged does the control wire member compress the contact sufficiently to close the switch and permit engine starting.

1 Claim, 12 Drawing Figures

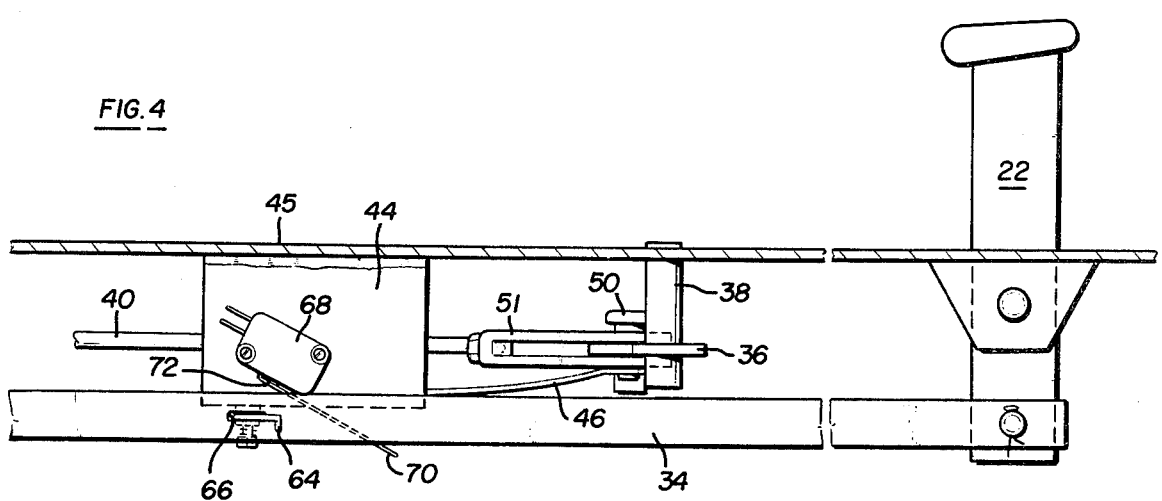
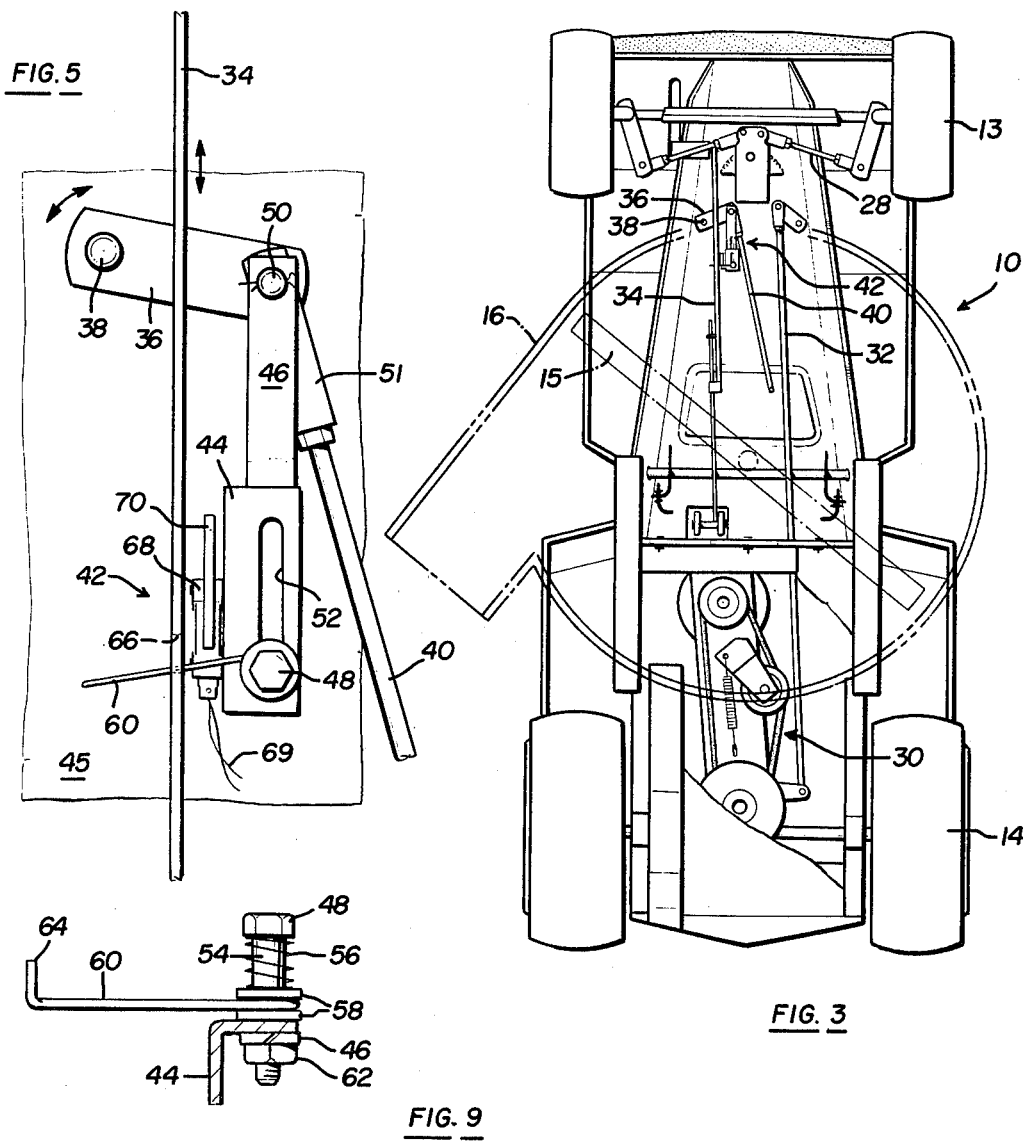

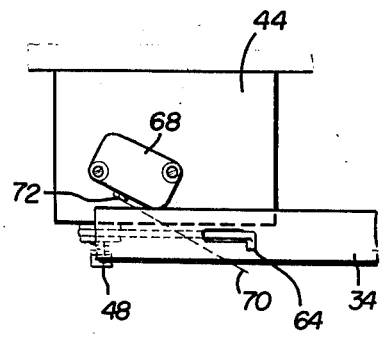
FIG. 10
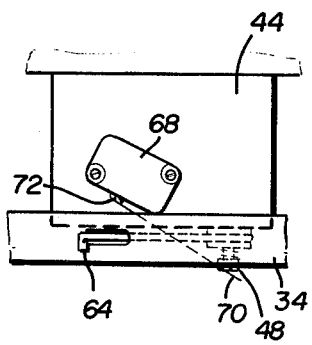
FIG. 11
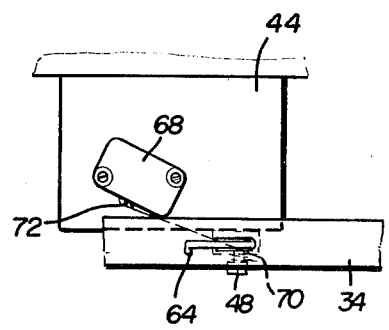
FIG. 12
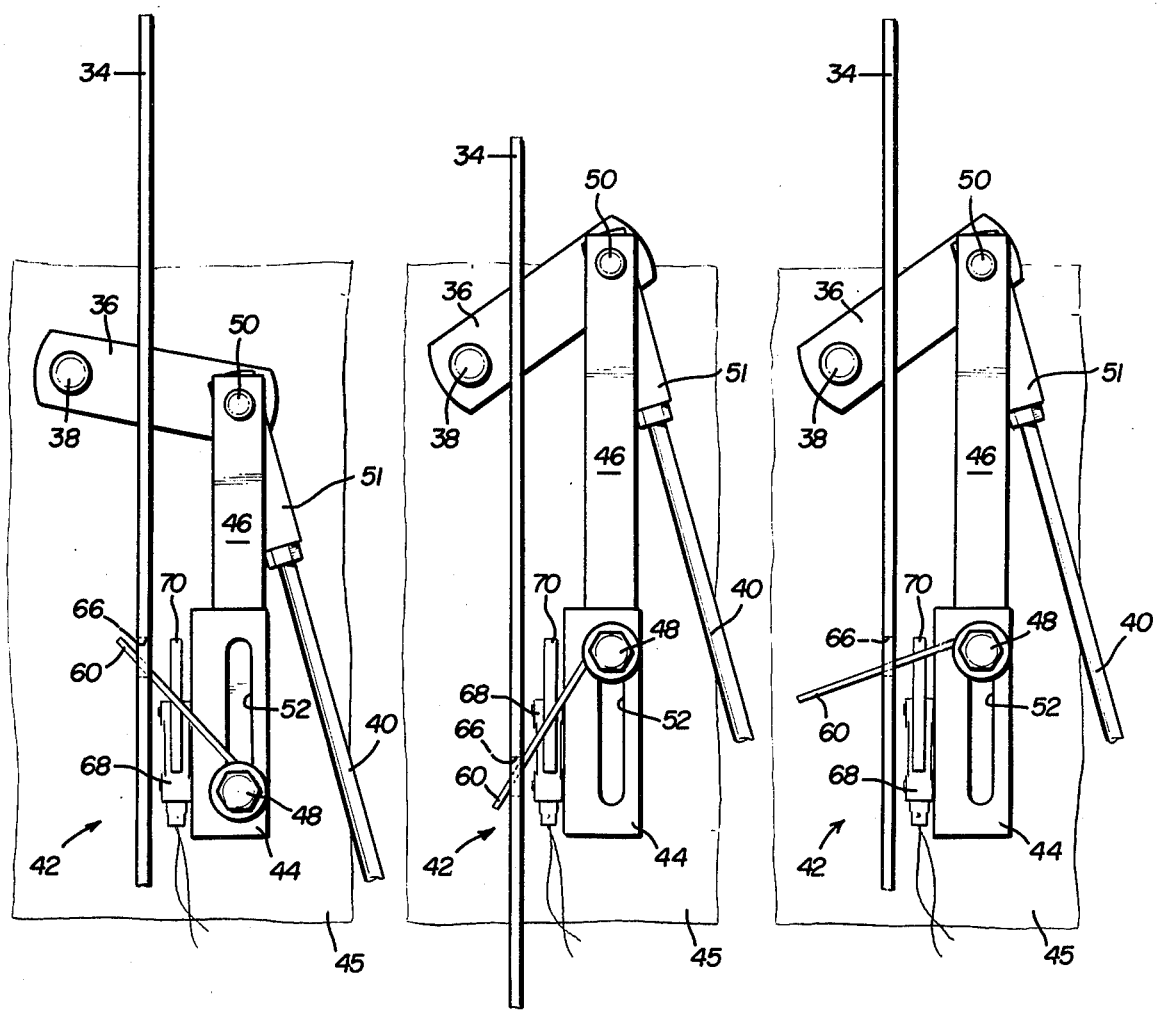
FIG. 6
FIG. 7
FIG. 8

IGNITION SYSTEM CONTROL

BACKGROUND OF THE INVENTION

This invention relates to an ignition system for garden tractors or the like, and more particularly, to a single switch interlock which prevents the tractor engine from starting when either the mower drive or transmission drive controls are in their engaged positions.

Ignition systems for garden tractors or the like are known which make the tractor electrical starting circuit inoperative under certain conditions. in U.S. Pat. No. 3,534,637, assigned to the assignee of the present invention, a mechanism is disclosed for rendering the starting circuit of the vehicle inoperative whenever the vehicle transmission is in its engaged position. The mechanism includes a switch incorporated into the starting circuit which is opened in response to movement of the shifting device for the transmission from a neutral to an engaged position. Another ignition interlock system is disclosed in U.S. Pat. No. 3,569,726, also assigned to the assignee of the present invention, which makes the tractor electrical system inoperative as soon as the operator removes his weight from the tractor seat. A plurality of electrical switches are connected in the circuit to electrically by-pass the seat-operated switch at the discretion of the operator.

There are disadvantages to the prior art type of start systems described. The vehicle transmission type requires relatively precise adjustment of the linkages, and there is no provision for making the starting circuit inoperative if a mower drive or the like is engaged in addition to the transmission. The seat-operated type requires a plurality of switches to operate the system when the operator is not in his seat. Thus, there has been a need for a simplified ignition system control device which is capable of preventing the tractor engine from starting when more than one drive control is engaged.

It is desirable to incorporate mechanism into the tractor starting system that will prevent the tractor engine from starting if either the transmission or mower drive is engaged. The prior art mechanisms proposed, including the ones discussed, have been expensive, are difficult to install and maintain, and are capable of being readily rendered inoperative. Thus, the disadvantages in present ignition system control devices have resulted in the single switch interlock of the present invention which prevents the tractor engine from starting when either the mower drive or transmission drive controls are in their engaged positions.

SUMMARY OF THE INVENTION

In accordance with the present invention, an ignition system control for garden tractors is provided which includes a control switch actuator interconnected with independently movable mower drive and transmission drive control linkages. The tractor engine may only be started when both drive control linkages are in their disengaged position and the control actuator switch is closed.

The control switch actuator incorporated in the starting circuit is normally open, and it is closed in response to the movement of both the mower drive control linkage and the transmission drive linkage to their disengaged positions. The control switch actuator is secured to a mounting plate which is fixed to the tractor chassis, and it includes an elongated cantilevered contact which is engageable by a control wire member. The control wire member is responsive to movement by either the mower drive control linkage or the transmission drive control linkage, and only when both linkages are in their disengaged positions will the control wire member compress the elongated cantilevered contact sufficiently to close the switch and permit engine starting.

The control wire member is rotatably mounted at one of its ends to an actuator strap which is connected to the mower drive linkage, and the other end of the control wire member is connected to a control lever of the brake-clutch linkage. The control wire member and actuator strap are connected together by a yieldable connector assembly which mounts the control wire member for both rotative and vertical movement. The connector assembly allows for wear and tolerance variations in the linkages and permits a less precise adjustment between the mower drive linkage and control wire member. The other end of the control wire member is held within a slot in the control lever for the brake-clutch drive linkage, and it is movable in response to movement of the control lever for the brake-clutch or transmission drive.

The actuator strap which is connected to the mower drive linkage and the control lever for the brake-clutch linkage are parallel to one another, and the control wire member is held in a transverse bridge-like fashion between the strap and control lever and above the elongated cantilevered switch contact. The control switch is mounted to the side of the chassis mounting plate between the actuator strap and control lever, and the free end of its cantilevered contact is compressed by the control wire member when both the mower drive and brake-clutch drive controls are disengaged.

The control lever and the actuator strap move in the same direction for engagement of the respective drives and move in the same direction for disengagement of the drives. When both the mower drive and brake-clutch controls are engaged, the control wire member is substantially transverse to the cantilevered switch contact and not touching it. If the mower drive is engaged and the brake-clutch control is disengaged, the control wire member crosses the switch contact but it does not compress it sufficiently to close the switch and, therefore, the tractor engine cannot be started. In a like manner, if the brake-clutch control is engaged and the mower drive is disengaged, the control wire member again crosses the switch contact but does not close it. Only when both drives are disengaged does the control wire compress the cantilevered switch contact sufficiently to close the switch. Thus, the drive controls move independently of one another, and the tractor engine can be started only when both controls are in their disengaged position.

The ignition system control of the present invention provides several advantages and features. A cost savings is provided because of the single switch actuator for two separate control drives. The single switch actuator permits the drive control linkages to move independently of each other without activating the switch until both drive control linkages are simultaneously in their disengaged positions. The ignition system control construction accommodates wear and tolerance variations in the linkages and requires less precise adjustments to provide the control functions of the switch actuator.

Other advantages and meritorous features of the ignition system control will be more fully understood from

BRIEF DESCRIPTION OF THE DRAWINGS

FIG. 3 is a bottom view of the garden tractor illustrating the drive linkages and ignition system control.

FIG. 4 is a fragmentary side elevational view of the ignition system control drive linkages.

FIG. 5 is a fragmentary bottom plan view of the ignition system control illustrating the mower drive and brake-clutch control in their engaged positions.

FIG. 6 is a fragmentary bottom plan view of the ignition system control illustrating the mower drive in its engaged position and the brake-clutch control in its disengaged position.

FIG. 7 is a fragmentary bottom plan view of the ignition system control illustrating the mower drive in its disengaged position and the brake-clutch control in its engaged position.

FIG. 8 is a fragmentary bottom plan view of the ignition system control illustrating the mower drive and brake-clutch control in their disengaged position whereby the tractor engine may be started.

FIG. 9 is a fragmentary detail view of the yieldable connector assembly between the control wire member and the mower drive actuator strap.

FIG. 10 is a fragmentary side detail illustrating the switch contact when the mower drive is engaged and the brake-clutch control is disengaged.

FIG. 11 is a fragmentary side detail illustrating the switch contact when the mower drive is disengaged and the brake-clutch control is engaged.

FIG. 12 is a fragmentary side detail illustrating the switch contact when both the mower drive and brake-clutch control are disengaged and the switch is closed to permit engine starting.

DESCRIPTION OF THE PREFERRED EMBODIMENT

Figure 2:
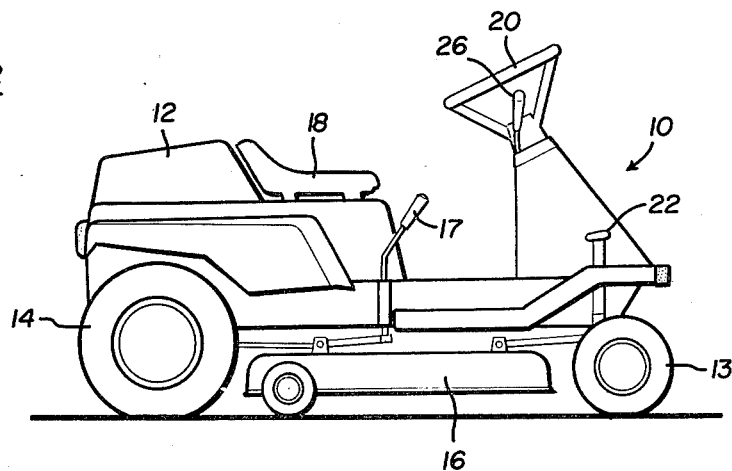
FIG. 2 is a side elevational view of the garden tractor illustrated in FIG. 1.
Figure 1:
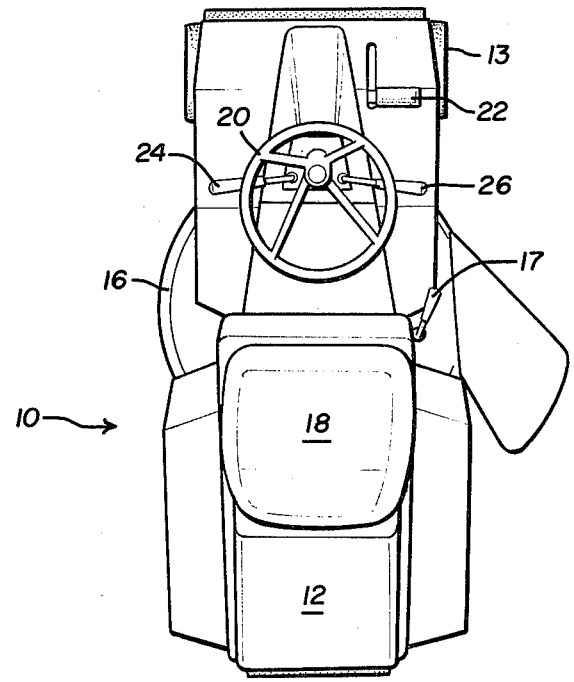
FIG. 1 is a top plan view of a conventional garden tractor incorporating the ignition system control of the present invention.

Referring to FIGS. 1-3, there is shown a garden tractor 10 incorporating the ignition system control of the present invention. The invention herein is adapted for use with variety of conventional garden tractor or similar type structures which have separate mower drive control and brake-clutch control.

The tractor 10 includes a main frame having a rear-mounted engine 12, front wheels 13, and rear wheels 14. A mower blade 15 (FIG. 3) is mounted for powered rotative movement about a vertical axis substantially midway of the longitudinal axis of the tractor. A mower deck 16 houses the mower blade 15, and a mower adjusting lever 17 provides for depth of cut adjustment as is conventional.

The operator sits in seat 18 and steers the tractor 10 by means of steering wheel 20. A foot-operated brake-clutch pedal 22 is provided for transmission control, and its operation is generally disclosed in application Ser. No. 797,706 assigned to the assignee of the present invention which is incorporated by reference herein for the purpose of describing the operation of the brake-clutch control. A travel control lever 24 and mower drive lever 26 are pivotally mounted to the steering column for use by the operator in controlling the wheel drive and mower drive respectively.

Referring to FIG. 3, the underside of the garden tractor is illustrated. The front suspension 28 is shown as well as the drive assembly 30 which is connected to the travel control lever 24 by control rod 32. The operation of the drive assembly 30 is generally disclosed in application Ser. No. 797,707 also assigned to the assignee of the present invention which is incorporated by reference herein for the purpose of describing the operation of the drive assembly.

Brake-clutch pedal 22 is connected to the brake-clutch mechanism by means of brake-clutch control lever 34. Mower drive lever 26 is connected to the mower drive by links 36 and 40. When an operator rotates mower drive lever 26, shaft 38 (FIG. 3) rotates and link 36, which is fixed to shaft 38, pivots to push or pull on link 40 thereby engaging or disengaging the mower drive. Similarly, when the operator depresses or releases pedal 22, brake-clutch control lever 34 moves fore or aft to either engage or disengage the brake-clutch mechanism.

Referring to FIGS. 4-10, the ignition system control 42 of the present invention is illustrated. The ignition system control includes a single control switch actuator 68 interconnected with the independently movable mower drive links 36 and transmission drive control lever 34. The tractor engine may be started only when both drive control linkages are in their disengaged positions and the control actuator switch 68 is closed. Switch 68 includes electrical leads 69 which are connected into the electrical starting circuit for the tractor engine. When switch 68 is closed, a circuit is made and the engine may be started.

The control switch actuator 68 is secured to a mounting plate 44 which is fixed to the tractor chassis 45. It includes an elongated cantilevered contact 70 which is engageable by a control wire member 60. The control wire member is responsive to movement by either the mower drive control linkage or the brake-clutch linkage, and only when both linkages are in their disengaged position will the control wire member 60 compress the elongated cantilevered switch contact 70 sufficiently to depress switch plunger 72 and close switch 68 thereby permitting engine starting.

The control wire member 60 is rotatably mounted at one of its ends to an actuator strap 46, and the other end of the control wire member is connected to brake-clutch control lever 34 by means of a slot 66 in control lever 34. The control wire member 60 and actuator strap 46 are connected together by a yieldable connector assembly (FIG. 9) which includes bolt 48, spacer 54, spring 56, washers 58, and nut 62. The yieldable connector mounts the control wire member 60 to the actuator strap 46 for both rotative and vertical movement. The yieldable connector is movable along slot 52 in mounting plate 44 in response to the actuator strap 46 being moved fore or aft by link 36. The connector allows for wear and tolerance variations in the linkages and permits a less precise adjustment between the actuator strap 46 and control wire member 60. The other end 64 of the control wire member 60 is hook-like, and it is held within a slot 66 in the control lever 34 of the brake-clutch linkage. Wire end 64 is movable in response to the fore and aft movement of control lever 34 depending on whether the brake-clutch is engaged or disengaged.

The mower drive link 40 has a clevis end 51, and a pin 50 passes through the ends of actuator strap 46 and link 40 to connect them to pivotable mower drive link 36. When the operator rotates mower drive lever 26, mower drive link 36 is pivoted thereby moving actuator strap 46 and drive link 40 fore and aft. Similarly, when the operator depresses and releases brake-clutch pedal 22, control lever 34 of the brake-clutch linkage is moved fore and aft.

The actuator strap 46 and control lever 34 are substantially parallel to one another and the control wire member 60 is held in a transverse bridge-like fashion between the strap and control lever and above the elongated cantilevered switch contact 70. The control switch 68 is mounted to the side of the chassis mounting plate 44 between the actuator strap 46 and control lever 34, and the free end of the cantilevered contact 70 is compressed by the control wire member 60 when both the mower drive linkage 36, 46, 40 and brake-clutch linkage 34 are in their disengaged positions.

The control lever 34 and actuator strap 46 move in the same direction for engagement of the respective drives, and they move in the same direction for disengagement of the drives. As illustrated in FIG. 5, the operator has rotated mower drive lever 26 to engage the mower drive and releases pedal 22 to engage the brake-clutch control. When both the mower drive linkage and brake-clutch control linkage are moved aft to their engaged positions as illustrated in FIG. 5, the control wire member 60 is substantially transverse to the cantilevered switch contact 70 and not touching it. Thus, the tractor engine may not be started with the drives engaged as illustrated in FIG. 5.

If the mower drive is engaged and the brake-clutch control is disengaged as illustrated in FIGS. 6 and 10, the control wire member 60 crosses the switch contact 70 but does not compress it sufficiently to close the switch 68 and, therefore, the tractor engine cannot be started. As illustrated in FIGS. 6 and 10, the actuator strap 46 remains aft in its engaged position, and the control lever 34 has been moved forwardly to its disengaged position which causes control wire member 60 to rotate about the vertical axis 48 and cross switch contact 70.

When the brake-clutch control is engaged and the mower drive is disengaged as illustrated in FIGS. 7 and 11, the control wire member 60 again crosses the switch contact 70 but does not close switch 68. In its engaged position, the actuator strap is pulled forwardly by link 36 thereby pulling the yieldable connector means along slot 52 while simultaneously rotating control wire member 60 as illustrated in FIG. 7. Thus, the drive controls move independently of one another, but the tractor engine may only be started when both controls are in their disengaged position.

FIGS. 8 and 12 illustrate the drive controls in their disengaged position. Both actuator strap 46 and control lever 34 have been pulled forwardly in response to the operator's movement of the respective drive linkages. In the position illustrated, the control wire member 60 not only crosses switch contact 70 but compresses it against switch button 72 which closes switch 68 and permits engine starting.

The ignition system control of the present invention provides several advantages and features. The switch actuator 68 provides a cost savings because a single switch is used for two separate control drives. The single switch actuator 68 permits the drive control linkages to move independently of each other without activating the switch until both drive control linkages are simultaneously in their disengaged positions. The ignition system control construction including the yieldable connector accommodates wear and tolerance variations in the linkages and requires less precise adjustments to provide the control function of the switch actuator 68.

It will be apparent to those skilled in the art that the foregoing disclosure is exemplary in nature rather than limiting, the invention being limited only by the appended claims.

1. An ignition system control for a garden tractor which includes a chassis, a mower drive control linkage, and a transmission drive control linkage, said ignition system contol comprising:

a control switch actuator mounted to said chassis between said drive control linkages, each of said drive control linkages being independently movable between engaged and disengaged positions, and said control switch actuator being connected to the electrical starting circuit of said tractor, and said control switch actuator including contact means;

a control member connected between said drive control linkages in a transverse bridge-like fashion above said contact means and the opposite ends of said control member being movable in response to the movement of either drive control linkage, means for mounting one end of said control member to an actuator means for both free rotative and vertical movement, said actuator means connected to one of said drive control linkages for longitudinal movement along the tractor chassis in response to the movement of said one drive control linkage, and the other end of said control member being mounted to the other of said drive control linkages for longitudinal movement along the tractor chassis in response to the movement of said other drive control linkage; and said control switch actuator being normally open to prevent engine starting and said switch actuator being closed by the movement of said drive control linkages to their disengaged position thereby causing said control member to engage said contact means and close said control switch actuator permitting engine starting.

* * * * *